United States Patent Office 3,257,419
Patented June 21, 1966

3,257,419
1,2,3,4 - TETRAHYDRO-1-(2 - IMINOTHIO-6-BENZO-THIAZOLYL) - 2 - THIOXO-4,4,6 - TRIMETHYLPYRIMIDINES
John J. D'Amico, Charleston, W. Va., and Ching C. Tung, Kirkwood, Mo., assignors to Monsanto Company, a corporation of Delaware
No Drawing. Original application Sept. 15, 1961, Ser. No. 138,296, now Patent No. 3,151,114, dated Sept. 29, 1964. Divided and this application Dec. 30, 1963, Ser. No. 334,557
4 Claims. (Cl. 260—247.1)

This application is a division of Serial No. 138,296, filed September 15, 1961, now Patent No. 3,151,114, September 29, 1964.

The present invention relates to 1,2,3,4-tetrahydro-1-(2-mercapto-6-benzothiazolyl) - 2 - thioxo-4,4,6-trimethylpyrimidine and derivatives thereof.

1,2,3,4-tetrahydro-1-(2 - mercapto - 6 - benzothiazolyl)-2-thioxo-4,4,6-trimethylpyrimidine can exist in two tautomeric forms as follows:

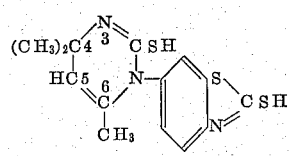

(I)
and

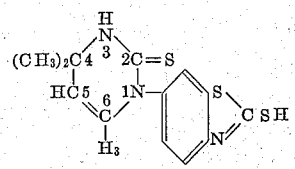

(II)

The structure is undoubtedly II predominately. For example, a disodium salt does not form. Of course, the same tautomerism is possible in the mercaptothiazole nucleus but the mercaptan structure is generally accepted and is consistent with the chemical properties observed. The preparation and properties of this compound are described in detail below:

Example 1

To a stirred slurry containing 79.0 grams (0.5 mole) of 1,1-dimethyl-3-oxobutylthiocyanic acid, 750 ml. of water and 6 grams of concentrated sulfuric acid was added in one portion 91.1 grams (0.5 mole) of 6-amine-2-mercaptobenzothiazole and the mixture heated at 80–90° C. for a period of 3 hours. After cooling to 25° C., the precipitate was collected by filtration, washed with water until the washings were neutral to litmus, and air-dried at 25–30° C. 1,4-dihydro-1-(2-mercapto-6-benzothiazolyl)-4,4,6-trimethyl-2-pyrimidinethiol (predominately 1,2,3,4-tetrahydro-1-(2 - mercapto - 6 - benzothiazolyl)-2 - thioxo - 4,4,6 - trimethylpyrimidine) was obtained in 97.5% yield. After recrystallization from dilute ethyl alcohol it melted at 207–209° C. Analysis gave 13.07% nitrogen and 29.3% sulfur compared to 13.07% nitrogen and 29.72% sulfur calculated for $C_{14}H_{15}N_3S_3$. This compound accelerates vulcanization of natural and synthetic rubber and imparts considerable processing safety. It is also a valuable intermediate and undergoes reactions typical of those known for mercaptobenzothiazole involving the mercaptan radical.

Since the mercapto hydrogen in the thiazole ring is active, a variety of derivatives can be obtained by replacing the hydrogen by other groups, as for example salt-forming groups and organic radicals. Among the organic radicals which may replace hydrogen are alkyl, alkenyl, halogen substituted alkenyl, dialkylaminoethyl, 2-butenylene, 2-butynyl, 2-propynyl, 2-cyclohexenyl, 2-oxocyclohexyl, 5,5,7,7-tetramethyl - 2 - octenyl, —CH$_2$—NH— groups such as

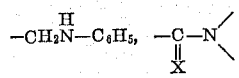

where X is sulfur or oxygen and the valences on the nitrogen may be satisfied by open or closed chain aliphatic radicals or divalent radicals which with nitrogen constitute a heterocyclic group, or phenyl

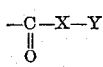

groups where X is sulfur or oxygen and Y is lower alkyl or alkenyl

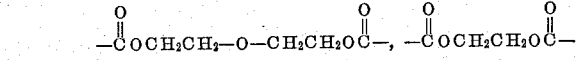

$CH_2COOH$ and chlorophenoxyacetyl. These, of course, are only illustrative of a few of the possible derivatives. All of them accelerate vulcanization to a greater or less degree. Replacing mercapto hydrogen with radicals which inactivate mercaptobenzothiazole do not appear to have the same effect on the product of Example 1. The term "free mercaptan" hereinafter designates the product of Example 1.

Example 2

A stirred slurry containing 64.3 grams (0.2 mole) of free mercaptan, 30 grams (0.3 mole—50% excess) of hexamethyleneimine and 400 ml. of isopropyl alcohol was heated at 45–50° C. for 1 hour. Then 156 ml. (0.3 mole) of sodium hypochlorite solution containing 14.28 grams of sodium hypochlorite per 100 ml. was added dropwise below the surface at 45–50° C. over a 2-hour period and the reaction mixture held at 45–50° C. for an additional hour. Thereupon, 5 grams of anhydrous sodium sulfite and 1000 ml. of water were added and the stirred reaction mixture cooled to 10° C. The precipitate was collected by filtration, washed with water until neutral to litmus and air-dried at 25–30° C. 2-(1-hexamethyleniminethio)-6-(1,2,3,4-tetrahydro-2-thioxo - 4,4,6-trimethylpyrimidinyl) benzothiazole was obtained in 93.5% yield as a brown solid melting at 170–173° C. with decomposition. The melting point remained unchanged after recrystallization from ethyl alcohol. Analysis gave 13.96% nitrogen and 22.06% sulfur compared to 13.38% nitrogen and 22.98% sulfur calculated for $C_{20}H_{26}N_4S_3$.

Example 3

In the procedure of Example 2, 60.2 grams (0.6 mole—200% excess) of morpholine was substituted for the hexamethyleneimine. After isolating the product as described, it was dissolved in an excess of ethyl alcohol and filtered to remove a small amount of impurities. The filtrate was diluted with an equal amount of water, cooled to 0° C. and the precipitate collected by filtration. After recrystallization from a minimum amount of ethyl alcohol, the 2-morpholinothio-6-(1,2,3,4 - tetrahydro - 2 - thioxo-4,4,6-trimethyl-1-pyrimidinyl)benzothiazole thus obtained was a tan solid melting at 168–170° C. with decomposition. Analysis gave 13.70% nitrogen and 22.75% sulfur compared to 13.78% nitrogen and 23.66% sulfur calculated for $C_{18}H_{22}N_4OS_3$.

Example 4

Replacing the hexamethyleneimine of Example 2 with 69 grams (0.6 mole) of cis- and trans-2,6-dimethylmorpholine, 2 - (2,6-dimethylmorpholinothio)-6-(1,2,3,4-tetrahydro-2-thioxo-4,4,6-trimethyl-1 - pyrimidinyl)benzothiazole was obtained in 98% yield as a buff solid melting at 115–123° C. with decomposition. After recrystallization as described in Example 3, the product melted at 123–125° C. with decomposition. Analysis gave 12.19% nitrogen compared to 12.89% calculated for $C_{20}H_{26}N_4OS_3$.

As further illustrative of the invention, natural rubber tread stocks were compounded comprising:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Sulfur | 2.5 |
| Antioxidant | 1.0 |
| Accelerator | 0.5 |

The accelerator added to the base stock is indicated below:

Stock:
A. 2-(1-hexamethyleniminethio) - 6-(1,2,3,4-tetrahydro-2-thioxo-4,4,6-trimethyl-1-pyrimidinyl)benzothiazole
B. 2-morpholinothio-6 - (1,2,3,4 - tetrahydro - 2 - thioxo-4,4,6-trimethyl-1-pyrimidinyl)benzothiazole
C. 2-(2,6 - dimethylmorpholinothio) - 6 - (1,2,3,4-tetrahydro-2-thioxo-4,4,6-trimethyl - 1 - pyrimidinyl)benzothiazole The stocks were cured in the usual manner by heating in a press for different periods of time at 144° C. Processing safety of the vulcanizable stocks was evaluated by means of a Mooney plastometer. The figures recorded were the times required for the Mooney plasticity at 135° C. to rise ten points above the minimum value. The modulus and tensile properties of the 60 minute cures are recorded:

TABLE I

| Stock | Modulus of Elasticity in lbs./in.² at Elongation of 300% | Tensile at Break in lbs./in.² | Mooney Scorch at 135° C. |
|---|---|---|---|
| A | 2,050 | 3,250 | 9.1 |
| B | 1,650 | 2,650 | 12.6 |
| C | 1,560 | 2,640 | 12.4 |

It is intended to cover all changes and modifications of the examples of the invention herein chosen for purposes of disclosure which do not constitute departures from the spirit and scope of the invention.

What is claimed is:
1. A compound of the formula

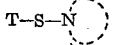

where T is 6-(1,2,3,4-tetrahydro-2-thioxo-4,4,6-trimethyl-1-pyrimidinyl)-2-benzothiazolyl and

is a heterocyclic radical selected from the group consisting of 1-hexamethyleniminyl, morpholino, and dimethylmorpholino.

2. 2 - (1 - hexamethyleniminethio) - 6 - (1,2,3,4 - tetrahydro-2-thioxo - 4,4,6 - trimethyl - 1 - pyrimidinyl)benzothiazole.

3. 2-morpholinothio-6 - (1,2,3,4 - tetrahydro - 2-thioxo-4,4,6-trimethyl-1-pyrimidinyl)benzothiazole.

4. 2-(2,6 - dimethylmorpholinothio) - 6 - (1,2,3,4-tetrahydro-2-thioxo - 4,4,6 - trimethyl - 1 - pyrimidinyl)benzothiazole.

No references cited.

HENRY R. JILES, *Acting Primary Examiner.*

JOSE TOVAR, *Assistant Examiner.*